M. D. LAWRENCE.
HARROW.
No. 174,913. Patented March 21, 1876.
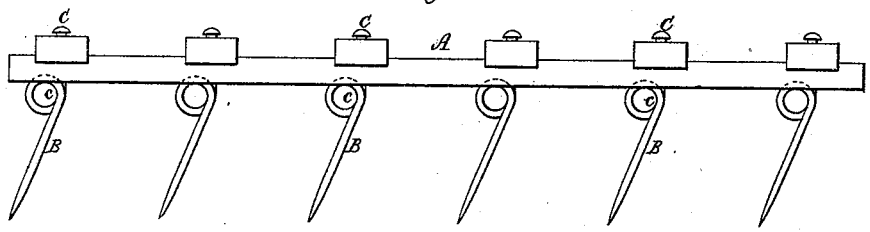
Fig. 1
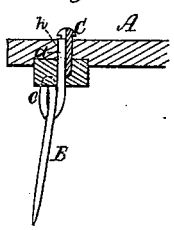   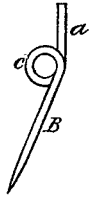
Fig. 2. Fig. 4. Fig. 6. Fig. 3.
Fig. 5.
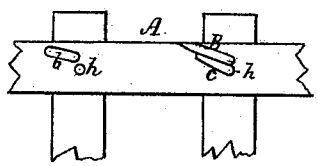
Fig. 7.
Witnesses
S. U. Piper
L. M. Miller
Mark D. Lawrence
by his attorney

UNITED STATES PATENT OFFICE.

MARK D. LAWRENCE, OF SOMERVILLE, MASSACHUSETTS.

IMPROVEMENT IN HARROWS.

Specification forming part of Letters Patent No. 174,913, dated March 21, 1876; application filed July 20, 1875.

*To all whom it may concern:*

Be it known that I, MARK D. LAWRENCE, of Somerville, of the county of Middlesex and State of Massachusetts, have made a new and useful invention having reference to Harrows or their Teeth; and do hereby declare the same to be fully described in the following specification, and represented in the accompanying drawings, of which—

Figure 1 is a side view of a harrow with my invention. Fig. 2 is a transverse section of one of its teeth and its fastening grooved pin. Fig. 3 is a side view of one of the teeth. Fig. 4 is a perspective view, Fig. 5 a top view, and Fig. 6 a longitudinal section, of the said pin. Fig. 7 is a bottom view of one of the tooth-bars, showing one tooth in place, and the socket and hole for reception of another.

In carrying out my invention I make the harrow-frame A with cylindrical holes $h$ $h$ extending up through it for the reception of the tangs $a$ of the teeth B, and near such hole $h$ I make, in the under side of the frame, a socket, $b$, to receive the upper part of the helix or spring $c$ of the tooth, such socket having a depth about equal to the thickness of the wire of which the tooth is composed. Having inserted the tang in a hole, $h$, and the helix $c$ on the socket $b$, I drive down into the wood and alongside of the tang, and with the latter in its groove, a tapering pin, C, grooved lengthwise, as shown at $d$.

The pin may be without the groove, but I prefer to have it provided with it, as under such circumstances it will hold the tang in its hole stronger or to better advantage.

By having the helix of the tooth inserted in a groove the tooth is prevented from turning out of place, so as to become loose in its tang-receiving hole, and, besides, it is better supported than it would be were the helix merely to rest in contact with the frame.

I claim—

1. In combination with the harrow-frame, provided with the tooth-holes $h$ and the sockets $b$, as described, the helical teeth made and inserted and fixed in said holes and sockets, all as shown and specified.

2. The tapering fastening-pin, provided with the groove $d$, arranged in it for reception of the tooth-tang, as explained, in combination with the said tooth-tang, arranged with such pin in the hole $h$ and with the tooth-helix $c$, arranged in the recess $b$, all as specified.

MARK D. LAWRENCE.

Witnesses:
R. H. EDDY,
J. R. SNOW.